(12) United States Patent
Lee et al.

(10) Patent No.: US 9,501,770 B2
(45) Date of Patent: Nov. 22, 2016

(54) ELECTRONIC MONEY CHARGING SERVICE SYSTEM, ELECTRONIC MONEY CHARGING SERVER AND CHARGING METHOD THEREOF

(75) Inventors: Wonjun Lee, Seoul (KR); Seungjin Choi, Seoul (KR);
(Continued)

(73) Assignee: SK PLANET CO., LTD., Seongnam-Si, Gyeonggi-Do (KR)

(*) Notice: Subject to any disclaimer, the term of this patent is extended or adjusted under 35 U.S.C. 154(b) by 726 days.

(21) Appl. No.: 13/264,633

(22) PCT Filed: Apr. 15, 2010

(86) PCT No.: PCT/KR2010/002346
§ 371 (c)(1),
(2), (4) Date: Oct. 14, 2011

(87) PCT Pub. No.: WO2010/120132
PCT Pub. Date: Oct. 21, 2010

(65) Prior Publication Data
US 2012/0036067 A1    Feb. 9, 2012

(30) Foreign Application Priority Data

Apr. 15, 2009  (KR) .................. 10-2009-0032964
Apr. 15, 2009  (KR) .................. 10-2009-0032965
(Continued)

(51) Int. Cl.
*G06Q 20/00*    (2012.01)
*G06Q 20/32*    (2012.01)
(Continued)

(52) U.S. Cl.
CPC .......... *G06Q 20/32* (2013.01); *G06Q 20/0655* (2013.01); *G06Q 20/105* (2013.01);
(Continued)

(58) Field of Classification Search
USPC ............ 705/66, 16, 21, 59, 71; 380/44, 262, 380/278, 279
See application file for complete search history.

(56) References Cited

U.S. PATENT DOCUMENTS

2005/0123317 A1* 6/2005 Hayashi ................ B41J 13/106
399/82
2005/0125317 A1* 6/2005 Winkelman, III ..... G06Q 20/04
705/30
(Continued)

FOREIGN PATENT DOCUMENTS

JP    2008-269062    11/2008
KR  10-2000-0063726  11/2000
(Continued)

OTHER PUBLICATIONS

International Search Report mailed Nov. 24, 2010 for PCT/KR2010/002346.
(Continued)

*Primary Examiner* — Dante Ravetti
(74) *Attorney, Agent, or Firm* — Hauptman Ham, LLP

(57) ABSTRACT

E-money recharge service system, e-money recharge server, and recharge method are disclosed. The e-money recharge service system includes: recipient terminal for receiving and storing e-money; payer terminal for performing settlement approval procedure for payment of e-money loaded into recipient terminal; and money recharge server for receiving input of money information including information on the whole or part of identification of recipient terminal, identification of payer terminal, recharge amount, and methods of payment from subscriber to money recharge service, for the subscriber acting money payer recharging the recipient terminal with e-money corresponding to recharge amount and making payment for settling recharge amount of money through the methods of payment, and for the subscriber acting money recipient transmitting message of inquiry to
(Continued)

payer terminal of settlement approval of recharge amount and recharging recipient terminal with e-money corresponding to recharge amount if settlement approval is issued by payer terminal.

6 Claims, 13 Drawing Sheets

(75) Inventors: Dongphil Lim, Seoul (KR); Hongkeun Ji, Seoul (KR); Dohyun Jang, Seoul (KR); Sangsoo Oh, Seoul (KR); Hoon Seong, Seoul (KR)

(30) Foreign Application Priority Data

Apr. 15, 2009 (KR) .................. 10-2009-0032969
Apr. 14, 2010 (KR) .................. 10-2010-0034481

(51) Int. Cl.
*G06Q 20/06* (2012.01)
*G06Q 20/10* (2012.01)
*G06Q 20/36* (2012.01)
*H04M 15/00* (2006.01)
*H04M 17/00* (2006.01)
*H04W 4/24* (2009.01)

(52) U.S. Cl.
CPC ........ *G06Q 20/363* (2013.01); *G06Q 20/3672* (2013.01); *H04M 15/00* (2013.01); *H04M 15/68* (2013.01); *H04M 17/20* (2013.01); *H04M 17/202* (2013.01); *H04M 17/204* (2013.01); *H04M 17/205* (2013.01); *H04M 17/206* (2013.01); *H04W 4/24* (2013.01)

(56) References Cited

U.S. PATENT DOCUMENTS

| | | | |
|---|---|---|---|
| 2006/0004656 A1* | 1/2006 | Lee ................ | G06Q 20/04 705/39 |
| 2010/0044430 A1* | 2/2010 | Song ............... | G06Q 20/04 235/379 |
| 2010/0078472 A1* | 4/2010 | Lin ................. | G06Q 20/32 235/379 |

FOREIGN PATENT DOCUMENTS

| | | |
|---|---|---|
| KR | 10-2004-0076399 | 9/2004 |
| KR | 10-2007-0021348 | 2/2007 |
| KR | 10-0767179 | 10/2007 |
| KR | 10-2008-0036180 | 4/2008 |

OTHER PUBLICATIONS

Chinese Office Action for application No. 201080016768.8 dated Nov. 4, 2013.

\* cited by examiner

SETTLEMENT CARD INFO

• Card Name
  [VISAMAST ▼]

• Card No.
  [            ]
  No "-" please

• Expiration (MMYY)
  [    ]

• Front 2 of PIN
  [  ]

• Last 7 of ID No.
  [          ]

[CONFIRM]   [CANCEL]

Registered credit card will be under exclusive and secure care of your card company and ○○ Communication Co. holds no such data.

*FIG. 5*

ELECTRONIC MONEY CHARGING SERVICE SYSTEM, ELECTRONIC MONEY CHARGING SERVER AND CHARGING METHOD THEREOF

CROSS REFERENCE TO RELATED APPLICATIONS

This application claims priority of Korean Patent Application No. 10-2009-0032964, filed on Apr. 15, 2009, Korean Patent Application No. 10-2009-0032969, filed on Apr. 15, 2009, Korean Patent Application No. 10-2009-0032965, filed on Apr. 15, 2009, and Korean Patent Application No. 10-2010-0034481, filed on Apr. 14, 2010 in KIPO (Korean Intellectual Property Office). Further, this application is the National Phase application of International Application No. PCT/KR2010-002346, filed on Apr. 15, 2010, which designates the United States and was published in Korean.

TECHNICAL FIELD

Aspects of the present disclosure relate to an electronic money recharge service system, an electronic money recharge server, and a recharge method thereof. More particularly, the present disclosure relates to an electronic money recharge service system for allowing individuals to interchange spending money wherein a money recipient's mobile communication terminal can take a direct load of the electronic equivalent of the paper money while processing the invoice for the electronic money charge to the recipient's terminal through a payer's mobile communication terminal or methods of payment such as a credit card, and to an electronic money recharge server and a recharge method thereof.

BACKGROUND ART

The statements in this section merely provide background information related to the present disclosure and may not constitute the prior art.

To people in general, cash of coins or bills is an unwanted volume or load to carry attended by the risk of unrecoverable loss. In response, to cope with the inconvenience and insecurity of carrying cash and to facilitate payments in financial transactions, credit card payment processing services have been widely used, to set up a credit limit for a user to buy first and pay later based on the user's credit credentials.

Recent years have seen the new idea of electronic money (e-money) of electronically setting and storing the value of money so that it takes the role of cash in trade. Depending on where the cash value is stored, the e-money is classified into IC (integrated circuit) card type of e-money and network type e-money.

Here, the IC card is a credit card-sized card with built-in IC chips for storing cash value in the form of electronic codes, and also goes by the name of smart card. The IC card is relatively safe from forgery and alteration as it uses the IC chips for storing e-money and has an embedded CPU (central processing unit) offering computing functions. As the existing cash cards are to withdraw cash from ATMs (automatic teller machines), the IC card replaces the cash withdrawal with an amount of e-money recharged to the IC card at a recharge machine, functioning as cash in a card affiliated store where payment is made by the e-money stored in the IC card for goods or services at a reading machine of the seller and then that payment price is transferred automatically to the seller's bank account linked. Such transactions with the IC card type of e-money resemble credit card transactions but the credit card transactions involve interventions of the credit card issuer in the payment process by making a beforehand payment of the price and waiting for the purchaser to pay back the corresponding amount, whereas the e-money IC card transactions skip such intervention stage resulting in an immediate transfer of fund which is of big difference. Recharging fund to the e-money IC card may be done repeatedly at ATMs equipped with the recharge machine, telephone handsets, bank tellers, PC (personal computer) and others. Such IC card-type e-money is useless in electronic commerce unless it is compatible with its networked counterpart.

The network type e-money is electronic money used in a computer network including PC communications and the Internet, and it is primarily used in the e-commerce. Users of the networked e-money goes through the computer network to withdraw funds from their banks and pay the purchase price of goods in the form of computer files. The networked e-money only works on the network with an initial installation of a networked e-money program followed by purchasing desired amount of e-money and then purchasing of a product through e-commerce which is completed with payment of the purchase price.

On the other hand, came with the latest developments of digital technology and communication technology which diversify the capabilities of mobile communication terminals are mobile communication terminal based digital wallet or e-wallet services utilizing an IC card installed in the terminal which then functions as a method of payment.

The terminal based e-wallet service involves having credentials for payment prestored in the e-wallet of the terminal and clearing a wireless internet e-commerce transaction or off-line payment of purchase price simply by using the stored e-wallet credentials. Such services have the advantage of providing convenience and security in practice due to a wireless public key infrastructure (WPKI) solution installed as well as multilevel security measures for accessing exclusively by the identified user without fear of information leaks.

Then, such mobile communication terminal based e-wallet services have a prerequisite that the IC e-wallet cards carry certain amount of positive balance. However, since it is difficult for users to constantly monitor the affordable balance through their own terminals, chances are they bear the awkward moments of low cash to checkout or being forced to take an untimely travel to the recharge venues and go through the reloading process with new cash which is a hindrance.

In particular, youth and senior citizens may want to receive spending money from others for recharging their terminal with e-money for use and they may get, so to speak, pissed off as of with low cash and low e-money balance which are not up to the price of purchase. In addition, if the spending money is deposited in a bank available for withdrawals and when e-money recharges are necessary, the account holder will have to rush to the bank at each low balance of e-money for the cumbersome routines of cash withdrawal and e-money recharge into the terminal.

DISCLOSURE

Technical Problem

Therefore, the present disclosure has been made in view of the above mentioned problems to provide an electronic money recharge service system for having individuals take or give spending money wherein a money recipient's mobile communication terminal may be directly loaded with the electronic equivalent of the paper money while processing the invoice for the e-money loaded to the recipient's terminal through a payer's mobile communication terminal or a method of payment such as credit card, and to an electronic money recharge server and a recharge method thereof.

Technical Solution

An aspect of the present disclosure provides an electronic money recharge service system including: a recipient terminal for receiving and storing an electronic money; a payer terminal for performing a settlement approval procedure for payment of the electronic money loaded into the recipient terminal; and a money recharge server for receiving an input of money information including information on the whole or part of a recipient identifier of the recipient terminal, a payer identifier of the payer terminal, a recharge amount, and a method of payment, from a subscriber to a money recharge service, wherein the money recharge server recharges the recipient terminal with the electronic money corresponding to the recharge amount and makes a payment for settling the recharge amount of money through the method of payment for the subscriber acting as a money payer, and transmits a message of inquiry to the payer terminal of a settlement approval of the recharge amount and recharges the recipient terminal with the electronic money corresponding to the recharge amount if the settlement approval is issued by the payer terminal for the subscriber acting as a money recipient.

Another aspect of the present disclosure provides an electronic money recharge server including: an input unit for receiving an input of money information from a subscriber to a money recharge service, the money information including information on a recipient terminal of a money recipient, a recharge amount, and a method of payment of the subscriber; an electronic money recharger for recharging the recipient terminal with an electronic money up to the recharge amount; and a settlement processor for processing an invoice for the electronic money recharged into the recipient terminal by using the method of payment introduced through the input unit.

In addition, the aforementioned electronic money recharge server may further include: an application provider for providing the recipient terminal with an application for allowing the money recipient to define a minimum amount and a set amount of the electronic money and transmitting a money call signal if a balance of the electronic money having been recharged is at or below the minimum amount after being defined; and a money call signal receiver for receiving the money call signal from the recipient terminal through the application having been provided. In this case, upon receiving the money call signal from the recipient terminal through the money call signal receiver, the electronic money recharger recharges the recipient terminal with the electronic money corresponding to the set amount up to the recharge amount.

Yet another aspect of the present disclosure provides an electronic money recharge server including: an input unit for receiving an input of money information from a subscriber to a money recharge service, the money information including information on a subscriber terminal, a payer terminal of a money payer, and a recharge amount; a message transmitter for transmitting a message of inquiry to the payer terminal of a settlement approval of the recharge amount and information on a method of payment; an electronic money recharger responsive to a settlement approval signal received from the payer terminal in response to the message, for recharging the subscriber terminal with an electronic money up to the recharge amount; and a settlement processor for processing an invoice for the electronic money recharged into the subscriber terminal by using the method of payment.

In addition, the aforementioned electronic money recharge server may further include: an application provider for providing the subscriber terminal with an application for allowing the subscriber to define a minimum amount and a set amount of the electronic money and transmitting a money call signal if a balance of the electronic money having been recharged is at or below the minimum amount after being defined; and a money call signal receiver for receiving the money call signal from the subscriber terminal through the application having been provided. In this case, upon receiving the money call signal from the subscriber terminal through the money call signal receiver, the electronic money recharger recharges the subscriber terminal with the electronic money corresponding to the set amount up to the recharge amount.

Yet another aspect of the present disclosure provides an electronic money recharge method including: receiving an input of money information from a subscriber to a money recharge service, the money information including information on a recipient terminal of a money recipient, a recharge amount, and a method of payment; recharging the recipient terminal with electronic money up to the recharge amount; and processing an invoice for the electronic money recharged into the recipient terminal by using the method of payment.

In addition, the aforementioned electronic money recharge method may further include: providing the recipient terminal with an application for allowing the money recipient to define a minimum amount and a set amount of the electronic money and transmitting a money call signal if a balance of the electronic money having been recharged is at or below the minimum amount after being defined; and receiving the money call signal from the recipient terminal through the application having been provided. In this case, upon receiving the money call signal from the recipient terminal through the step of receiving the money call signal, the step of recharging may recharge the recipient terminal with the electronic money corresponding to the set amount up to the recharge amount.

Alternatively, the aforementioned electronic money recharge method may further include: providing the recipient terminal with an application for transmitting the money call signal if the balance of the electronic money having been recharged is at or below the minimum amount after being defined; accepting the minimum amount and the set amount of the electronic money from the subscriber; and receiving the money call signal from the recipient terminal through the application having been provided. In this case, upon receiving the money call signal from the recipient terminal through the step of receiving the money call signal, the step of recharging may recharge the recipient terminal with the electronic money corresponding to the set amount up to the recharge amount.

Yet another aspect of the present disclosure provides an electronic money recharge method including: receiving an input of money information from a subscriber to a money recharge service, the money information including information on a subscriber terminal, a payer terminal of a money payer, and a recharge amount; transmitting a message of inquiry to the payer terminal of a settlement approval of the recharge amount and information on a method of payment; if a settlement approval signal is received from the payer terminal in response to the message, recharging the subscriber terminal with electronic money up to the recharge amount; and processing an invoice for the electronic money recharged into the subscriber terminal by using the method of payment.

In addition, the aforementioned electronic money recharge method may further include: accepting a minimum amount and a set amount from the subscriber; providing the subscriber terminal with an application for transmitting a money call signal if a balance of the electronic money having been recharged is at or below the minimum amount after being defined; and receiving the money call signal from the subscriber terminal. In this case, upon receiving the money call signal from the subscriber terminal through the step of receiving the money call signal, the step of recharging may recharge the subscriber terminal with the electronic money corresponding to the set amount up to the recharge amount.

Alternatively, the aforementioned electronic money recharge method may further include: providing the subscriber terminal with an application for transmitting a money call signal if a balance of the electronic money having been recharged is at or below a minimum amount after being defined; accepting the minimum amount and a set amount from the payer terminal; and if the balance of the electronic money recharged into the subscriber terminal is at or below the minimum amount after being defined, receiving the money call signal from the subscriber terminal. In this case, upon receiving the money call signal from the subscriber terminal through the step of receiving the money call signal, the step of recharging may recharge the subscriber terminal with the electronic money corresponding to the set amount up to the recharge amount.

Advantageous Effects

According to an aspect of the present disclosure, electronic money may be interchanged between individuals with enhanced convenience by the electronic money recharge method wherein a money recipient's mobile communication terminal can take a direct load of the electronic equivalent of the paper money, processing the invoice for the e-money loaded to the recipient's terminal through a money payer's mobile communication terminal or a method of payment such as a credit card.

Besides, according to an aspect of the present disclosure, the electronic money accumulated onto recipient's mobile communication terminal is identifiably split to portions of the electronic money corresponding to the spending money transfers to and from the money payer and the money recipient to bring about the planned money spending and managements.

DESCRIPTION OF DRAWINGS

FIG. 5 is a view of a message example of taking card information for a credit card selected as a method of payment.

MODE FOR INVENTION

Figure 1:
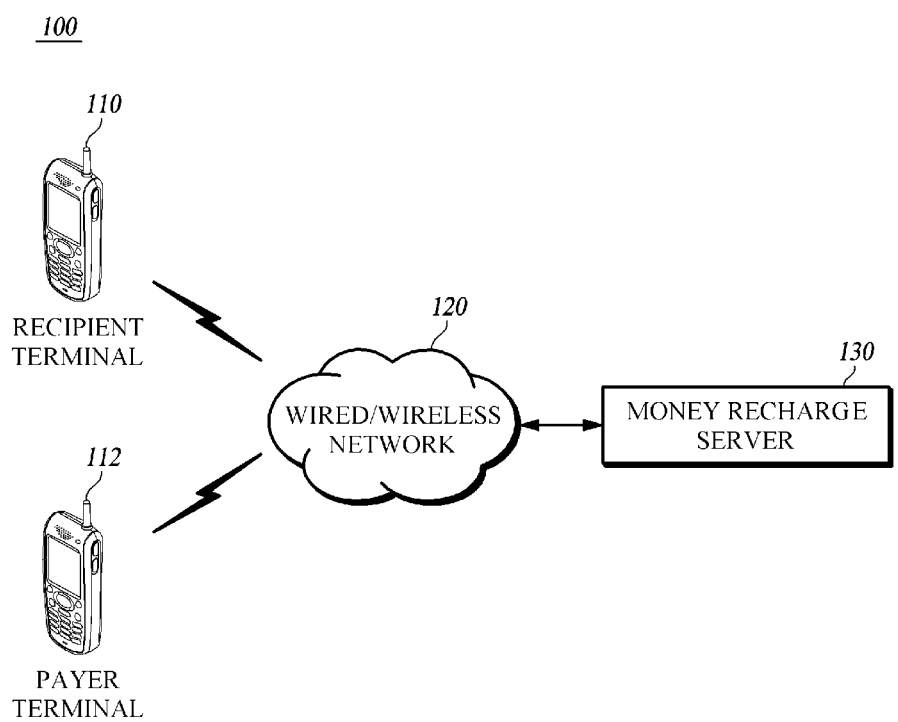
FIG. 1 is a schematic diagram of an electronic money recharge service system according to an aspect, FIG. 2 a schematic diagram of an electronic money recharge server according to an aspect.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a schematic diagram of an electronic money recharge service system 100 according to an aspect.

Electronic money recharge service system 100 in this aspect may include a recipient terminal 110, a wired/wireless network 120, and a money recharge server 130.

Recipient terminal 110 is carried by a money recipient and assumes an e-money terminal for using an e-money recharge service to take cash worth of e-money through money recharge server 130 on the basis of third party proxy payment.

The money recipient may join a money recharge service over wired/wireless connection to money recharge server 130 to register money information including information on recipient terminal 110, a money payer's terminal (hereinafter called 'payer terminal') 112, and a recharge amount of the cash worth of e-money. The information on payer terminal 112 includes credentials of one or more of the money payer's name, the phone number of payer terminal 112, and so on.

In addition, the money recipient may download and install an application for automatically recharging the cash worth of e-money into recipient terminal 110. In such case, recipient terminal 110 is allowed to change, delete, or add to register money information by using the installed application.

Here, the money recharge service is provided by electronic money recharge service system 100 and refers to a service for letting a subscriber to designate another's terminal as recipient terminal 110 to recharge with the cash worth of e-money and act to process the invoice for the same, or allowing the subscriber acting as a money recipient to recharge the subscriber's own terminal with the cash worth of e-money on the third party proxy payment basis.

Payer terminal 112 is carried by the financing money payer and may use the e-money recharge service to load the other's terminal (hereinafter called 'recipient terminal') with the cash worth of e-money through money recharge server 130 and perform a settlement approval procedure for payment of the e-money loaded.

At the request of the money recipient subscribing to the money recharge service, payer terminal 112 may connect to money recharge server 130 to make a settlement by proxy for payment of the e-money loaded into recipient terminal 110. In addition, the money payer may choose to join the e-money recharge service independent of the money recipient, registering money recharge server 130 with the money information including information on recipient terminal 110, a recharge amount of the e-money corresponding to the spending money or the cash worth of e-money, and methods of payment and then have the e-money recharged automatically to recipient terminal 110. Here, the information on payer terminal 112 includes credentials of at least one of the money recipient's name, the phone number of recipient terminal 110, and so on.

In addition, payer terminal 112 may download and install an application which works in unison with recipient terminal 110 and money recharge server 130 to automatically recharge recipient terminal 110 with the e-money from money recharge server 130. In this case, using the installed application, payer terminal 112 may change, delete, or add to register money information.

Recipient terminal 110 and payer terminal 112 may be a personal computer or PC, notebook or laptop computer, personal digital assistant or PDA, portable multimedia player or PMP, PlayStation Portable or PSP, or mobile communication terminal, smart phone or such devices, and refer to a variety of apparatuses equipped with, for example, a communication device such as a modem for carrying out communications between various devices or wired/wireless communication networks, a memory for storing various programs for allowance-funding automatic money recharge services, and a microprocessor for executing the programs to effect operations and controls. In the aspects to follow, mobile communication terminals will be used for illustrative purpose.

Wired/wireless network 120 conceptually encompasses wired networks such as a wired telephone network and intranet, and wireless networks such as wireless telephone network, mobile communication network, WiBro (Wireless Broadband) also known as WiMax network, and wireless LAN network, and refers to the networks for allowing multiple communication apparatuses to mutually connect to communicate by wire or wirelessly.

Money recharge server 130 means a server which replenishes recipient terminal 110 subscribing to the money recharge service with the cash worth of e-money corresponding to the subsequent invoice for a partner to pay by proxy, or accepts an invoice payment from the partner subscribing to the money recharge service for recharging the recipient terminal 110 with the corresponding cash worth of e-money. Such money recharge server 130 may be implemented by a typical network server and generates a webpage or WAP page for the e-money recharge service and sends the same to recipient terminal 110 and payer terminal 112.

In addition, with the money recharge service subscriber registered as a money payer, money recharge server 130 may receive an input of money information including information on the identification of recipient terminal 110, a recharge amount, and a method of payment from the subscriber, recharge recipient terminal 110 with the e-money corresponding to the recharge amount, and process the invoice for the e-money through the method of payment inputted.

In addition, with the money recharge service subscriber registered as a money recipient, money recharge server 130 may receive an input of money information including information on the identification of subscriber terminal 110, the identification of payer terminal 112, and a recharge amount from the subscriber, transmit a message of inquiry to payer terminal 112 of a settlement approval of the recharge amount, and recharge recipient terminal 110 with the e-money corresponding to the recharge amount if the settlement is approved by payer terminal 112. At this time, the invoice for the e-money loaded to recipient terminal 110 is allowed to be processed through the money payer's method of payment inputted through the message.

Figure 2:
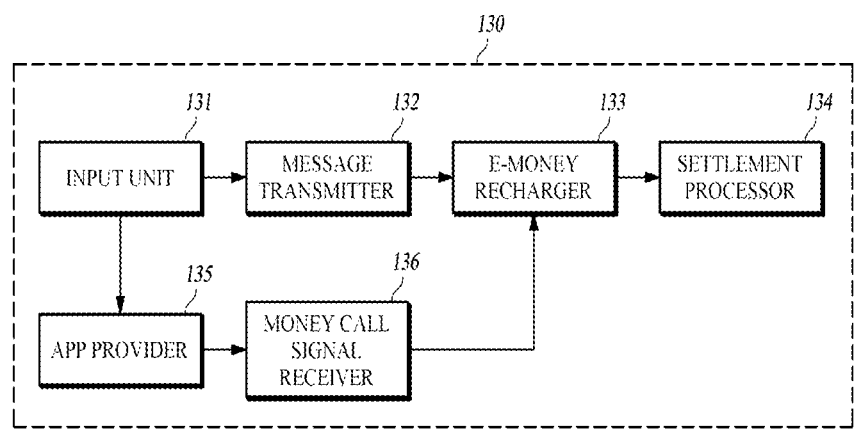

FIG. 2 a schematic diagram of an e-money recharge server according to an aspect. The e-money recharge server of FIG. 2 is configured for when the subscriber registers to money recharge server 130 of FIG. 1 as the money recipient.

Referring to FIG. 2, e-money recharge server 130 includes an input unit 131, a message transmitter 132, an e-money recharger 133, and a settlement processor 134. E-money recharge server 130 may further include an application provider 135 and a money call signal receiver 136.

From the subscriber acting the money recipient to the money recharge service, input unit 131 receives an input of money information including information on the identification of recipient terminal 110, the identification of payer terminal 112 of the money payer, and a recharge amount. In this case, input unit 131 may receive the input of required information via the webpage or WAP page sent to subscriber terminal (recipient terminal) or receive the same via an application to be described.

Message transmitter 132 transmits a message of inquiry to payer terminal 112 registered through input unit 131 of a settlement approval of the recharge amount and credentials of the method of payment. Here, the message may be implemented by an SMS short message, a multimedia message, a call back URL, and so on.

E-money recharger 133 recharges recipient terminal 110 with e-money corresponding to the recharge amount upon receiving a settlement approval signal from payer terminal 112 in response to the message sent thereto. Here, the settlement approval signal received from payer terminal 112 includes the credentials of the method of payment inputted by the money payer, and e-money recharger 133 may carry out an authentication process through an official certification, a mobile carrier server, or others with respect to the information on the method of payment received from payer terminal 112.

Settlement processor 134 processes an invoice for the e-money recharged into recipient terminal 110 by using the method of payment inputted from payer terminal 112. For example, if a credit card is the method of payment inputted from payer terminal 112, settlement processor 134 asks the concerned credit card service provider's server (not shown) to pay for the e-money based on the input of credit card number, PIN number, etc. received from payer terminal 112. In addition, if a communication terminal is what's inputted from payer terminal 112, settlement processor 134 asks the servicing mobile carrier server (not shown) to pay for the e-money based on at least one credentials of the money payer's name, ID number, phone number, certification, etc. received from payer terminal 112.

Application provider 135 provides recipient terminal 110 with an application. Here, the application is a program such as a virtual machine (VM) that works in unison with a subscriber identity module (SIM) card, a universal subscriber identity module (USIM) card, an IC card and the like of recipient terminal 110 to carry out the functions of recharging e-money as directed by money recharge server 130 and monitoring the balance of the recharged e-money. The application also lets the money recipient to define a minimum amount and a set amount of e-money, manages the e-money loaded into recipient terminal 110 based on the minimum amount and the set amount as defined by the money payer through money recharge server 130, and transmits a money call signal to have e-money corresponding to the defined set amount if the balance of e-money loaded into recipient terminal 110 is at or below the defined minimum amount. In this case, the set amount may be defined in divided allocations considering how long the loaded amount could last. For example, to offer daily divisions of a loaded amount allowed over a week, the loaded amount for spending in the week may be divided by seven to bring the set amount to define on a daily spending basis.

Money call signal receiver 136 receives the money call signal from recipient terminal 110 through the provided application, and directs e-money recharger 133 to charge recipient terminal 110 with the set amount of e-money. In this case, message transmitter 132 may compare the current balance of the loaded amount to the minimum amount to see if the former is less, and if yes it transmits a message to alert the low balance of the loaded amount to recipient terminal 110. Additionally, in response to the lowered balance of the loaded amount below the minimum amount, message transmitter 132 may send a message of inquiry to payer terminal 112 of a second settlement approval and information on a method of payment.

Figure 3:
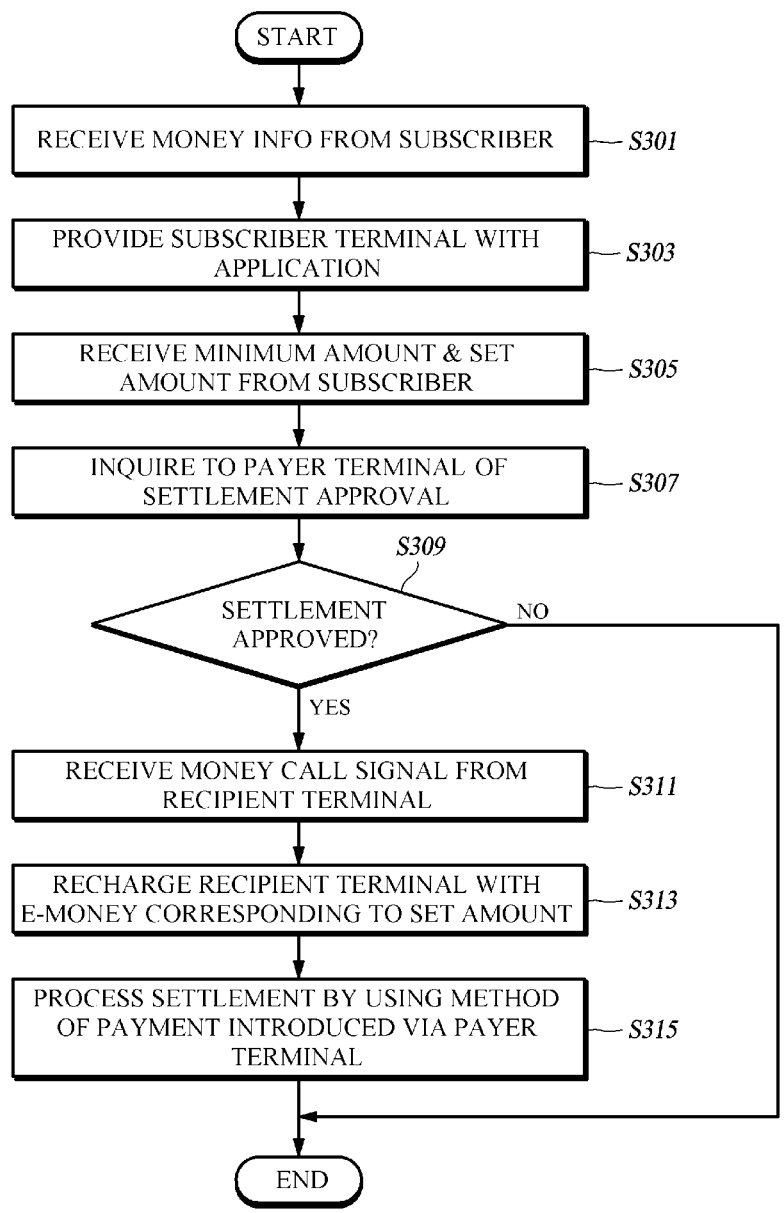
FIG. 3 is a flow diagram of an electronic money recharge method using the electronic money charging server of FIG. 2 according to an aspect.

FIG. 3 is a flow diagram of an electronic money recharge method using the electronic money charging server of FIG. 2 according to an aspect. Referring to FIG. 3, the function and operation of the electronic money charging server of FIG. 2 will be detailed.

Figure 4:
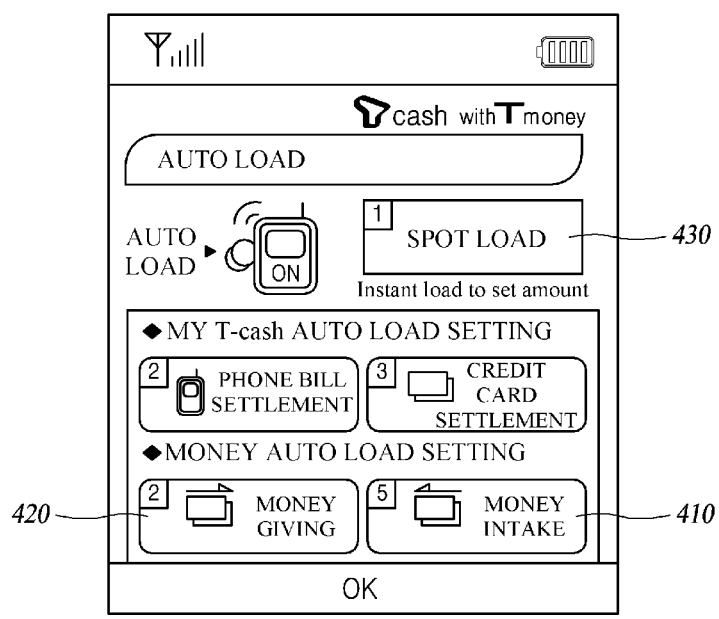
FIG. 4 is a view of a screen example implemented on a terminal of a subscriber to a money recharge service.

When a mobile communication terminal user subscribes to a money recharge service, money recharge server 130 sends a webpage or WAP page as illustrated in FIG. 4 to the subscriber's terminal. Alternatively, the illustrated screen may be implemented through the subscriber's downloaded application from money recharge server 130 or a built-in application at the time of manufacturing the mobile communication terminal.

The money recharge subscriber may choose to enter a self-registration acting as a money recipient and/or a money payer through the webpage or WAP page implemented as in FIG. 4 or a similar application screen. For example, to register as the money recipient the subscriber may select a menu of money intake 410 while the subscriber may select a menu of money giving 420 to register as the money payer. Besides, to make a self-recharging of e-money to the mobile communication terminal in possession by way of subscriber's own credit card, phone bill, account transfer, etc., a menu of spot load 430 may be selected. Functions of spot load 430 are not the focus of the present disclosure and will not be further detailed.

FIG. 3 illustrates the electronic money recharge method for when the money recharge subscriber registers as the money recipient. With the money recharge subscriber registered as the money recipient, subscriber's terminal functions as recipient terminal 110. In this case, input unit 131 receives an input of money information including information on recipient terminal 110, the money payer's payer terminal 112, and a recharge amount (S301).

Application provider 135 may display a message for suggesting installation of the application on the screen of the fresh recipient terminal 110, and provide recipient terminal 110 with an application (S303). In this case, among other functions, the application works in unison with the SIM card, USIM card, IC card and the like of recipient terminal 110 to carry out the functions of recharging e-money as directed by money recharge server 130 and monitoring the balance of the loaded e-money.

Input unit 131 may receive inputs of a minimum amount and a set amount up to a charge amount from the subscriber. At this time, the inputs of the minimum and set amounts may be received through the webpage or WAP page or through the application provided to subscriber terminal 110. Alternatively, it may be implemented that defining the minimum and set amounts is skipped and subscriber terminal 110 gets a direct load of e-money corresponding to the recharge amount with the settlement approval.

Message transmitter 132 transmits a message of inquiry of a settlement approval of the recharge amount to payer terminal 112 which is designated through by the recipient through input unit 131, and in response to payer terminal 112 approving of the settlement of the recharge amount, transmits an inquiry message of the method of payment (S307). At this time, if the money payer selects a credit card to make the settlement, message transmitter 132 may transmit an inquiry message for information on the settling credit card as shown in FIG. 5. Through the inquiry message for information on the settling credit card transmitted to payer terminal 112, the money payer can input information of the card name, card number, expiration date, PIN number, and so on.

Figure 6:
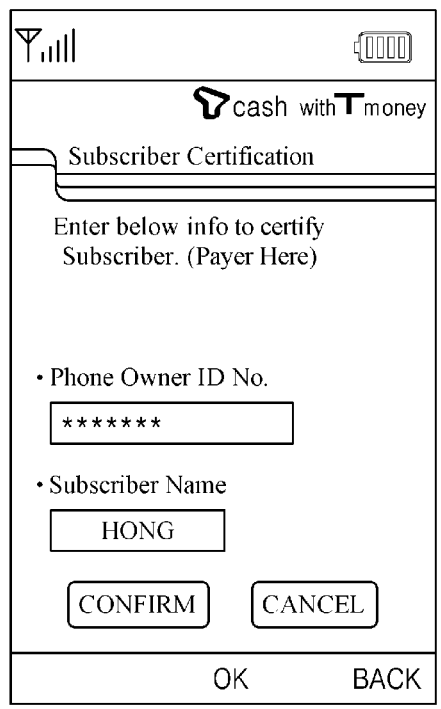
FIG. 6 is a view of a message example of an authentication for a payer terminal selected as the method of payment.

In addition, if the money payer selects the mobile communication terminal in possession as the method payment, message transmitter 132 may transmit a message as illustrated in FIG. 6 to carry out a money payer authentication process. In this case, the money payer authentication process may require information of at least one of the mobile communication terminal owner's ID number, name or others. In addition, it may be implemented that a similar message is also sent to subscriber terminal 110 or the money recipient's terminal to have the money recipient's certification process to be carried out.

Figure 7:
FIG. 7 is a view of a message example of a money recharge service subscription offer transmitted to the payer terminal from a message transmitter of FIG. 2.

For the purpose of a fluent cooperation with payer terminal 112, message transmitter 132 may transmit a leading message for the money payer to enter the money recharge service as shown in FIG. 7. If the money payer responds to leading message and joins the money recharge service, application provider 135 may provide payer terminal 112 with the application for installation through which operations with money recharge server 130 may be smoothly performed in unison.

Upon receiving a settlement approval signal for approving of the settlement of the recharge amount from payer terminal 112 in response to the message from message transmitter 132 (S309), e-money recharger 133 may recharge subscriber terminal 110 with e-money corresponding to the recharge amount with the settlement approval. Alternatively, if the subscriber inputted the minimum amount and the set amount within the limit of the recharge amount, e-money recharger 133 may respond to a reception of a money call signal made from subscriber terminal 110 through its installed application by recharging payer terminal 112 with e-money corresponding to the set amount. Here, the application functions to compare the current balance of e-money loaded to subscriber terminal 110 against the minimum amount to transmit the money call signal if the balance is at or below the minimum amount. At the same time, if the subscriber terminal 110 is loaded with e-money corresponding to the set amount up to the recharge amount defined by the subscriber, it may be implemented that message transmitter 132 acts before the loading to send a text message for notifying payer terminal 112 of the expected loading of e-money corresponding to the set amount, or to transmit the concerned text message and perform the approval process.

Figure 8:
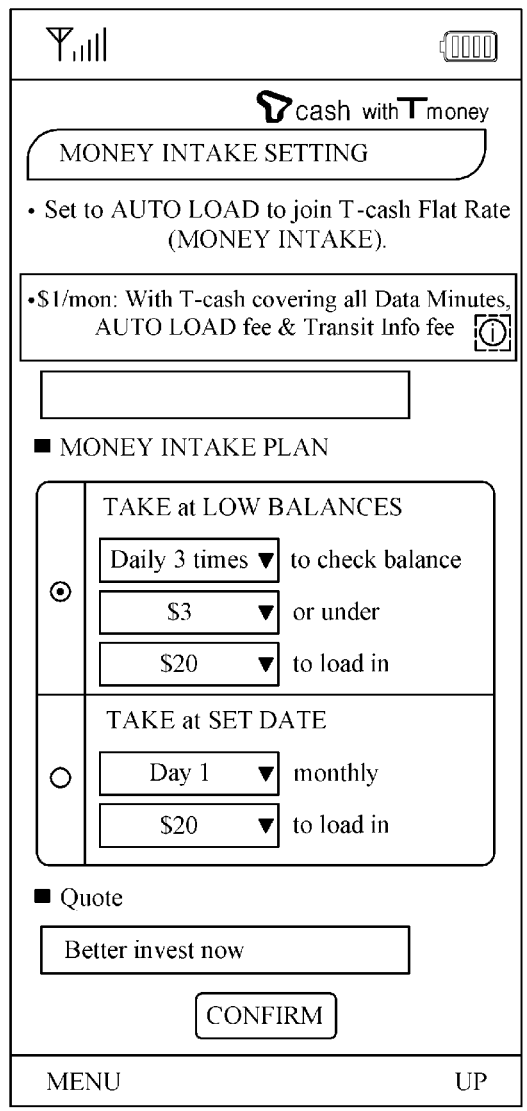
FIG. 8 is a view of an exemplifying money intake setting screen implemented by a recipient terminal for receiving spending money.

FIG. 8 is a view of an exemplifying money intake setting screen implemented in a recipient terminal for receiving spending money. As illustrated, the money intake setting screen may have an information message 810 displayed. In addition, the money intake setting screen may display an entry window to permit the subscriber to set up specific methods of receiving money (hereinafter called 'money intake plan'). Such money intake plan may be classified into menus of a 'take at low balance' 820, a 'take at set date' 830, etc.

Menu 'take at low balance' 820 lets the subscriber to divide the recharge amount under the settlement approval by the money payer into set amounts so that e-money of the set amount is automatically recharged whenever the balance is short. At this time, menu 'take at low balance' 820 is available for setting to monitor the balance of subscriber terminal 110 at a set interval, set time, and/or by set times, and have e-money of the set amount automatically reloaded if the e-money balance is at or below the minimum amount. For example, assuming the recharge amount is 100 dollars, the e-money balance may be checked three times a day to see if it gets to the minimum amount of 3 dollars or under, and if so, e-money of the set amount by 20 dollars may be subjected to the automatic reloading. However, unlimited by this specific configuration, the aspect of the present disclosure may be implemented to let the money recipient to simply set the minimum amount to which the e-money balance may be compared insufficient, when payer terminal 112 is asked to make the settlement for the recharge amount or recipient terminal 110 is loaded with e-money corresponding to the recharge amount.

Menu 'take at set date' 830 may have a reminder message for money giving sent to payer terminal 112 at a date prearranged with the payer monthly or daily or such, or have e-money of the recharge amount automatically loaded to recipient terminal 110 at the set date.

Meanwhile, in response to the subscriber's selection of menu 'take at low balance' 820, the application provided to subscriber terminal 110 determines whether the loaded e-money in subscriber terminal 110 is at or below the minimum amount. For example, if the setting is to monitor the e-money balance three times a day to see if it gets to the minimum amount of 3 dollars or under as in FIG. 8, the application is responsible to determine whether the e-money balance is at or below the minimum 3 dollars at the preset interval and/or for the preset time. The e-money balance determined to be at or under the minimum amount would lead to an issuance of the money call signal which is transmitted to money call signal receiver 136 of money recharge server 130 (S311).

Upon receiving the money call signal through the application, money call signal receiver 136 of money recharge server 130 controls e-money recharger 133 to load subscriber terminal 110 with e-money of the set amount (S313).

At the same time, settlement processor 134 processes the settlement by using method of payment included in the settlement approval signal received from payer terminal 112 (S315). For example, if a credit card is the method of choice for payment, the settlement processor may ask the concerned credit card service provider's server (not shown) to pay the invoice based on the input of credit card information received from payer terminal 112. In addition, if the money payer's method of choice for payment is the payer's own terminal 112, its mobile carrier billing server may be arranged to take the invoice to pay.

In this way, the money recipient is empowered to set cleverly planned self-payments with the personalized length of spending, demanded amount, and more considered, whereby money can be efficiently spent to a higher level.

Figure 9:
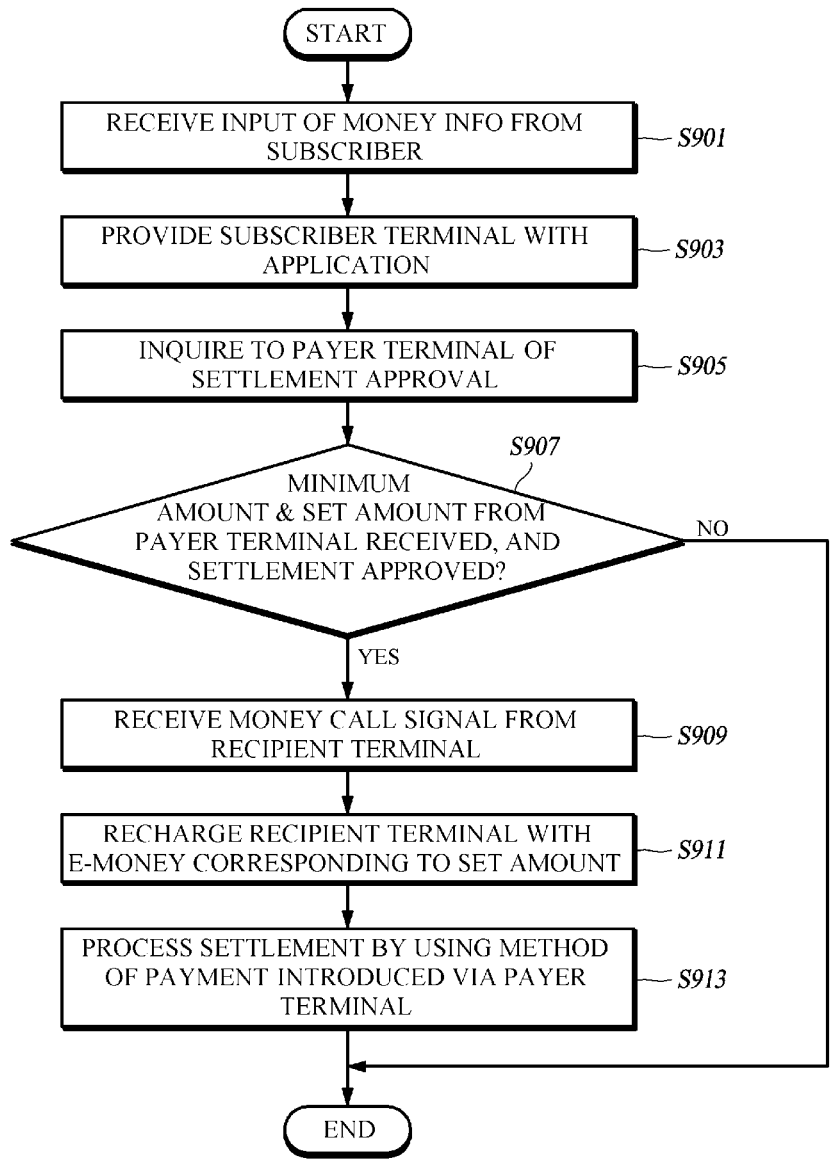
FIG. 9 is a flow diagram of an electronic money recharge method using the electronic money charging server of FIG. 2 according to another aspect, FIG. 10 a schematic diagram of an electronic money recharge server according to another aspect.

FIG. 9 is a flow diagram of an electronic money recharge method using the electronic money charging server of FIG. 2 according to another aspect. Here, steps S901, S903, and S909 to S913 are respectively similar to steps S301, S303, and S311 to S315, and their detailed descriptions are accordingly omitted. However, in this aspect of the disclosure, when input unit 131 transmits an inquiry message to payer terminal 112 of the settlement approval based on information on payer terminal 112 that has been set up by the money recharge service subscriber and money recipient (S905), the money payer may respond as to the settlement approval at the same time of activating the webpage or WAP page displayed on payer terminal 112 or the installed application to define the minimum amount and the set amount for the e-money to be loaded to recipient terminal 110 (S907). Information on the minimum amount and the set amount defined through payer terminal 112 may be transmitted to money recharge server 130 which controls the application installed in subscriber terminal 110 to break the recharge amount into the money payer-defined set amounts and automatically recharge subscriber terminal 110 with the set amount if the balance of e-money loaded to subscriber terminal 110 is at or below the minimum amount. Here, method of defining the minimum amount and the set amount is same as the method described above. In addition, this aspect may also skip defining the minimum and set amounts where subscriber terminal 110 gets the load of e-money corresponding to the recharge amount with the settlement approval.

In this way, the money payer may offer planned payments automatically recharged over the considered length of spending, available amount and so on, leading the money recipient to spend money more efficiently.

Figure 10:
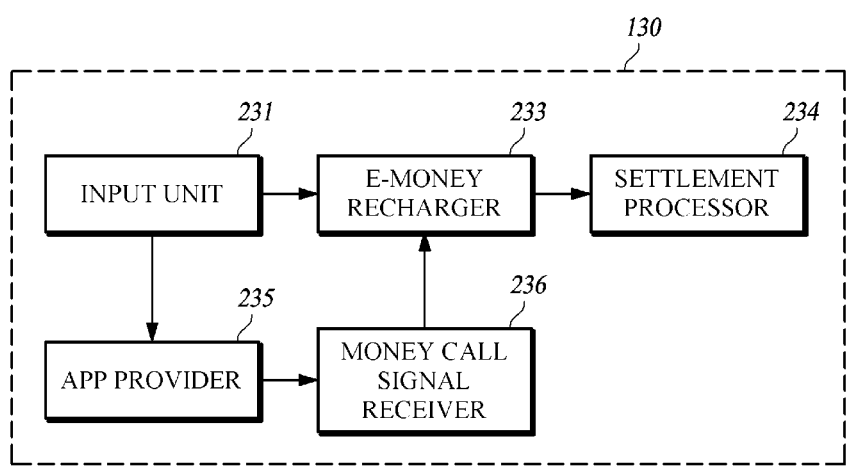

FIG. 10 a schematic diagram of an electronic money recharge server according to another aspect. The e-money recharge server of FIG. 10 is configured for when the subscriber registers to money recharge server 130 of FIG. 1 as the money payer.

Referring to FIG. 10, e-money recharge server 130 includes an input unit 231, an e-money recharger 233, and a settlement processor 234. E-money recharge server 130 may further include an application provider 235 and a money call signal receiver 236.

From the subscriber acting the money payer to the money recharge service, input unit 231 receives an input of money information including information on the identification of recipient terminal 110, a recharge amount, and information on a method of payment. In this case, input unit 231 may receive the input of required information via the webpage or WAP page sent to payer terminal 112 or receive the same via an application after downloading and installing from money recharge server 130.

E-money recharger 233 recharges recipient terminal 110 with e-money up to the recharge amount inputted through input unit 231. Here, e-money recharger 233 may carry out an authentication process through an official certification, a mobile carrier server, or others with respect to the information on the method of payment received through input unit 231.

Settlement processor 234 processes an invoice for the e-money recharged into recipient terminal 110 by using the method of payment inputted through input unit 231. For example, if a credit card is the method of payment inputted, settlement processor 234 asks the concerned credit card service provider's server (not shown) to pay for the e-money based on the received credit card number, PIN number, etc. In addition, if a communication terminal is the method payment inputted through input unit 231, settlement processor 234 asks the servicing mobile carrier's billing server (not shown) to pay for the e-money based on credentials of the received money payer's name, ID number, communication terminal number, ID number, certification, etc.

Application provider 235 provides recipient terminal 110 with the application. For this purpose, application provider 235 may transmit a message to recipient terminal 110 instructing to connect to money recharge server 130 and download the application, or transmit message to recipient terminal 110 encouraging a subscription to the money recharge service.

Money call signal receiver 236 receives a money call signal transmitted from recipient terminal 110 through the application, and directs e-money recharger 233 to charge recipient terminal 110 with the set amount of e-money. In this case, it may be implemented that the current balance of the loaded amount is compared to the minimum amount to see if the former is less, and then recipient terminal 112 displays a message to alert the low balance of the loaded amount, a message of inquiry of a recharging, etc.

Figure 11:
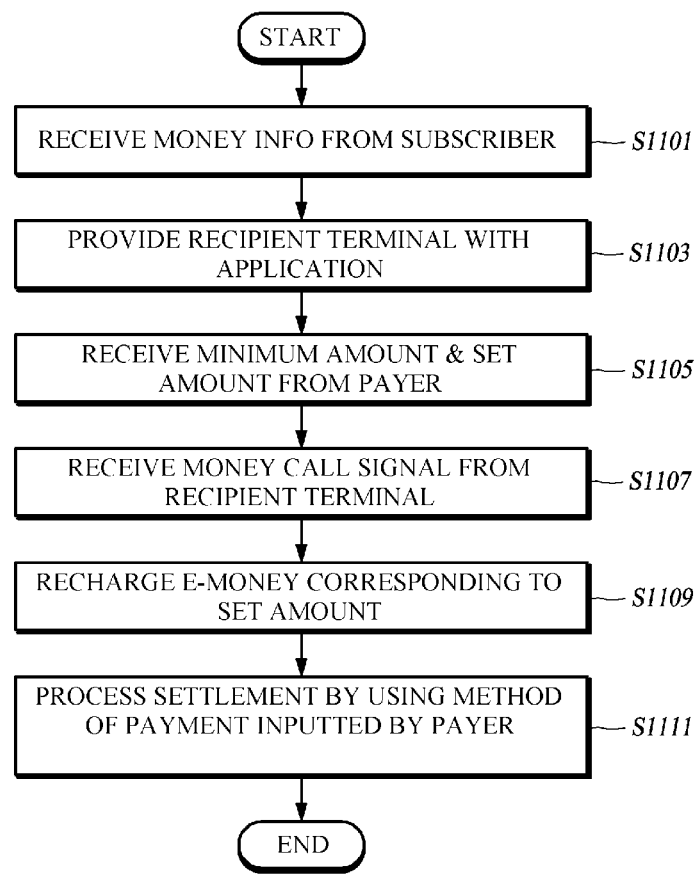
FIG. 11 is a flow diagram of an electronic money recharge method using the electronic money charging server of FIG. 10 in an aspect.

FIG. 11 is a flow diagram of an electronic money recharge method using the electronic money charging server of FIG. 10 in an aspect. Referring to FIG. 11, the function and operation of the electronic money charging server of FIG. 10 will be detailed.

When a mobile communication terminal user subscribes to a money recharge service, money recharge server 130 sends the webpage or WAP page as illustrated in FIG. 4 to the subscriber's terminal. Alternatively, the illustrated screen may be implemented through the subscriber's downloaded application from money recharge server 130 or a built-in application at the time of manufacturing the mobile communication terminal.

The money recharge subscriber may enter a money payer registration by selecting a menu setting of 'money giving' 420 on the webpage, WAP page, or an application screen implemented as in FIG. 4.

Figure 12:
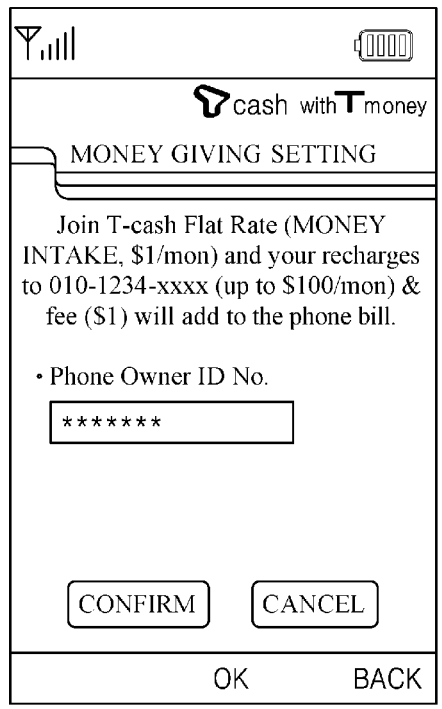
FIG. 12 is a view of a screen example of an authentication procedure for a communication terminal selected by a money payer as the method of payment.

With the money recharge subscriber registered as the money payer, subscriber's terminal functions as payer terminal 112. In this case, input unit 231 receives from the subscriber an input of money information including information on recipient terminal 110, a recharge amount, and information on the method of payment (S1101). In addition, if a credit card is the method of choice of payment, input unit 231 may have payer terminal 112 display the screen as illustrated in FIG. 5 on which the subscriber may enter required information. In addition, if the subscriber's mobile communication terminal is selected as the method of payment, input unit 231 may have payer terminal 112 display an information message screen as illustrated in FIG. 12 possibly resulting in an approval to transmit an authentication screen as shown in FIG. 6 and prosecute an authentication process with respect to the mobile communication terminal. In addition, input unit 231 may have a message displayed on payer terminal 112 for identifying recipient terminal 110 by its phone number, owner name, ID number, etc.

Figure 13:
FIG. 13 is a view of a message example of a money recharge service subscription offer transmitted to a recipient terminal.

Meanwhile, money recharge server 130 may transmit an alerting message of money given by the payer to recipient terminal 110, or transmit a suggesting message of a subscription to the money recharge service as shown in FIG. 13. In addition, it may transmit a suggesting message of a download and installation of the application from money recharge server 130 to recipient terminal 110 and control application provider 235 to provide the application to recipient terminal 110 (S1103).

Figure 14:
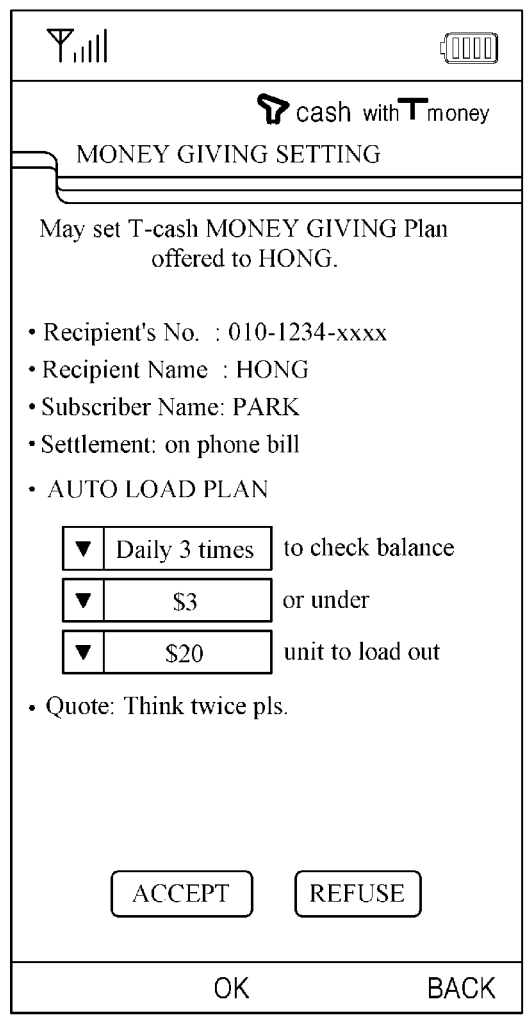
FIG. 14 is a view of an exemplifying money supply setting screen displayed on a payer terminal.

Application provider 231 may also have the webpage, WAP page, or the application to display a money giving setting screen as illustrated in FIG. 14 on payer terminal 112. Through such screen the subscriber acting the money payer may define the minimum and set amounts of e-money to be loaded into recipient terminal 110. As specifically illustrated, the setting is to monitor the balance of the e-money loaded into balance 3 times a day at a preset interval or preset time to see if it gets to the minimum amount of 3 dollars or under to recharge by the set amount of 20 dollars (S1105). One of other functions to include may be setting automatic recharges into recipient terminal 110 with e-money of the recharge amount at predetermined date(s).

Based on the money payer's setting of the minimum amount and set amount, money call signal receiver 236 monitors the balance of e-money loaded to recipient terminal 110 through its installed application. In addition, money call signal receiver 236 receives the money call signal via the application if the balance of e-money loaded to recipient terminal 110 is at or below the minimum amount (S1107). In response to the money call signal received by money call signal receiver 236, e-money recharger 233 loads recipient terminal 110 with e-money corresponding to the recharge amount (S1109).

At this time, settlement processor 234 processes the invoice for the e-money loaded into recipient terminal 110 by the method of payment received through input unit 231 (S1111). For example, if the money payer chooses a credit card as the method of payment, the settlement processor may ask the concerned credit card server (not shown) to pay the invoice based on the input of credit card information received from payer terminal 112. In addition, if the money payer's method of choice for payment is the payer's own terminal 112, the settlement processor may ask its mobile carrier billing server to take the invoice.

In this way, the money payer may offer planned payments automatically recharged over the considered length of spending, available amount and so on, leading the money recipient to spend money more efficiently.

Figure 15:
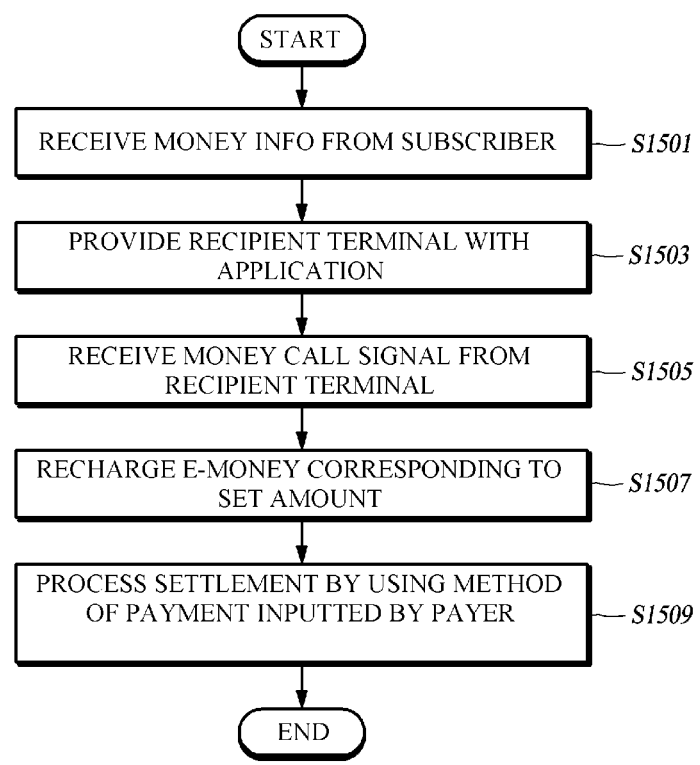
FIG. 15 is a flow diagram of the electronic money recharge method using the electronic money charging server of FIG. 10 in another aspect.

FIG. 15 is a flow diagram of the electronic money recharge method using the electronic money charging server of FIG. 10 in another aspect. Here, steps S1501 and S1503 are respectively similar to steps S1101 and S1103, and their detailed descriptions are accordingly omitted.

The electronic money recharge method of FIG. 15 differs from that of FIG. 11 in that with the money recharge subscriber registered as the money payer, the subscriber is allowed to define the minimum and set amounts up to the recharge amount which was received by the money recipient. In this case, the step S1105 of FIG. 11 for the subscriber to define the minimum and set amounts is omitted.

Based on the minimum amount and set amount defined through the application installed in recipient terminal 110, money call signal receiver 236 monitors the balance of e-money loaded to recipient terminal 110. In addition, money call signal receiver 236 receives the money call signal via the application if the balance of e-money loaded to recipient terminal 110 is at or below the minimum amount (S1505). In response to the money call signal received by money call signal receiver 236, e-money recharger 233 loads recipient terminal 110 with e-money corresponding to the set amount (S1507).

At this time, settlement processor 234 processes the invoice for the e-money loaded into recipient terminal 110 by the method of payment received through input unit 231 (S1509). For example, if the money payer chooses a credit card as the method of payment, the settlement processor may ask the concerned credit card server (not shown) to pay the invoice based on the input of credit card information received from payer terminal 112. In addition, if the money payer's method of choice for payment is the payer's own terminal 112, the settlement processor may ask its mobile carrier billing server to take the invoice.

This empowers the money recipient to set planned self-payments over the considered length of spending, demanded amount, and other factors to spend money with upmost efficiency.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such program may be easily deduced by a person skilled in the art. The computer program may be stored in computer readable media, which in operation can realize the aspects of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purpose, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of money recharge apparatus by using mobile communication terminals to allow money to be interchanged between individuals with enhanced convenience by the electronic money method wherein a money recipient's mobile communication terminal can take a direct load of the electronic equivalent of the paper money, processing the invoice for the electronic money loaded to the recipient's terminal through a money payer's mobile communication terminal or a method of payment such as a credit card to enhance the convenience of using the electronic money for both the money payer and the money recipient.

The invention claimed is:

1. An electronic money recharge service system comprising:
   a recipient terminal processor;
      a non-transitory medium containing stored instructions, when executed by the recipient terminal processor, cause the recipient terminal processor to perform the steps of:
      receiving electronic money;
      storing the received electronic money;
      transmitting to a recharge server processor information on a method of payment to make a payment for settling a recharge amount of money;
      determining a settlement approval procedure for the payment of the electronic money to be loaded into the recipient's terminal;
      transmitting to the recharge server information on the method of payment to make a payment for settling the recharge amount of money;
      transmitting a settlement approval to the recharge server processor;
   a payer terminal processor;
      a non-transitory medium containing stored instructions, when executed by the payer terminal processor, cause the payer terminal processor to perform the step of:
      transmitting the settlement approval to the recharge server processor;
   a recharge server processor;
      a non-transitory medium containing stored instructions, when executed by the recharge server processor, cause the recharge server processor to perform the steps of:
      receiving money information from the recipient terminal or the payer terminal;
         wherein the received money information including at least one of (i) information on a whole or part of an identification of the recipient terminal, (ii) information on an identification of the payer terminal, (iii) the recharge amount, and (iv) the method of payment;

recharging the recipient terminal with the electronic money corresponding to the received recharge amount of money;

determining that the money recharge server receives the money information from the payer terminal;

based on the determination that the money recharge server received the money information from the payer terminal, sending payment for settling the received recharge amount of money through the received method of payment;

determining that the transmitted settlement approval is received from the payer terminal;

transmitting to the payer terminal a message of inquiry of a settlement approval of the received recharge amount;

recharging the recipient terminal with the electronic money corresponding to the received recharge amount; and transmitting to the recipient terminal processor or the paver terminal processor an application that defines a minimum amount and a set amount of the electronic money;

determining, by the transmitted application, that a balance of the electronic money having been recharged is at or below the defined minimum amount; and based on the determination, by the transmitted application, that a balance of the electronic money having been recharged is at or below the defined minimum amount, transmitting a money call signal.

2. An electronic money recharge server for replenishing a mobile communication terminal and making a payment for settling a recharge amount of money, the electronic money recharge server comprising:

the electronic money recharge server;

a non-transitory medium containing stored instructions, when executed by the electronic money recharge server, cause the electronic money recharge server to perform the steps of:

receiving, by the input unit, money information from a recipient terminal or a paver terminal;

wherein the money information including at least one of information on a whole or part of an identification of the recipient terminal, information on a payer terminal, a recharge amount and a method of payment;

determining that the money information is received from the recipient terminal;

based on the determination that money information is received from the recipient terminal transmitting a message of inquiry to the payer terminal of a settlement approval of the recharge amount and information on the received method of payment;

determining, that a settlement approval signal is received from the payer terminal;

based on the determination that a settlement approval signal is received from the payer terminal, recharging the recipient terminal with an electronic money up to the received recharge amount;

transmitting, to the recipient terminal or the paver terminal, an application so that the recipient terminal or the payer terminal defines a minimum amount and a set amount of the electronic money;

determining, by the transmitted application, that a balance of the electronic money having been recharged is at or below the defined minimum amount; and based on the determination, by the transmitted application, that a balance of the electronic money having been recharged is at or below the defined minimum amount, transmitting a money call signal.

3. The electronic money recharge server of claim 2, further comprising:

a money call signal receiver that receives the money call signal from the recipient terminal through the application having been provided, wherein, upon receiving the money call signal from the terminal through the money call signal receiver, the electronic money recharger recharges the terminal or the payer terminal with the electronic money corresponding to the set amount up to the recharge amount.

4. An electronic money recharge method for replenishing a mobile communication terminal and making a payment for settling a recharge amount of money, the method performed by an electronic money recharge server and comprising:

receiving, by the recharge server, money information from a recipient terminal or a paver terminal;

wherein the money information including at least one of information on a whole or part of an identification of the recipient terminal, information on a payer terminal, a recharge amount and a method of payment;

determining, by the recharge server, that the money information is received from the recipient terminal;

based on the determination, by the recharge server, that the money information is received from the recipient terminal, transmitting a message of inquiry to the paver terminal of a settlement approval of the recharge amount and information on the received method of payment;

determining, by the recharge server, that a settlement approval signal is received from the payer terminal;

based on the determination, by the recharge server, that a settlement approval signal is received from the payer terminal, recharging the recipient terminal with an electronic money up to the received recharge amount;

creating, by the recharge server, an invoice for the electronic money recharged into the recipient terminal by making a payment for settling the recharge amount of money through the received method of payment;

transmitting, by the recharge server, to the recipient terminal or the payer terminal, an application so that the recipient terminal or the payer terminal defines a minimum amount and a set amount of the electronic money;

determining, by the transmitted application, that a balance of the electronic money having been recharged is at or below the defined minimum amount; and based on the determination, by the transmitted application, that a balance of the electronic money having been recharged is at or below the defined minimum amount, transmitting a money call signal.

5. The electronic money recharge method of claim 4, further comprising:

accepting the defined minimum amount and a set amount from the recipient terminal; and receiving the money call signal from the terminal recipient, wherein receiving the money call signal from the recipient terminal is through the step of receiving the money call signal, recharging recharges of the recipient terminal with the electronic money corresponding to the set amount up to the recharge amount.

6. The electronic money recharge method of claim 4, further comprising:

accepting a defined minimum amount and a set amount from the payer terminal;

determining, that a balance of the electronic money having been recharged is at or below the defined minimum amount;

based on a determination, that a balance of the electronic money having been recharged is at or below the defined minimum amount, transmitting to the recipient terminal with an application for transmitting a money call signal;

receiving the money call signal from the recipient terminal, wherein receiving the money call signal from the recipient terminal through the step of receiving the money call signal, recharging recharges of the recipient terminal with the electronic money corresponding to the set amount up to the recharge amount.

\* \* \* \* \*